INVENTOR
E. F. BROWN
BY Harry C. Hart
ATTORNEY

Feb. 13, 1962 E. F. BROWN 3,021,384

TIME DIVISION MULTIPLEXING OF TELEVISION AND TELEPHONE MESSAGES

Filed Dec. 28, 1959 2 Sheets-Sheet 2

INVENTOR
E. F. BROWN
BY Harry C. Hart
ATTORNEY

United States Patent Office 3,021,384

Patented Feb. 13, 1962

3,021,384

TIME DIVISION MULTIPLEXING OF TELEVISION AND TELEPHONE MESSAGES

Earl F. Brown, New Brunswick, N.J., assignor to Bell Telephone Laboratories, Incorporated, New York, N.Y., a corporation of New York Filed Dec. 28, 1959, Ser. No. 862,228

6 Claims. (Cl. 178—5.6)

Figure 1:
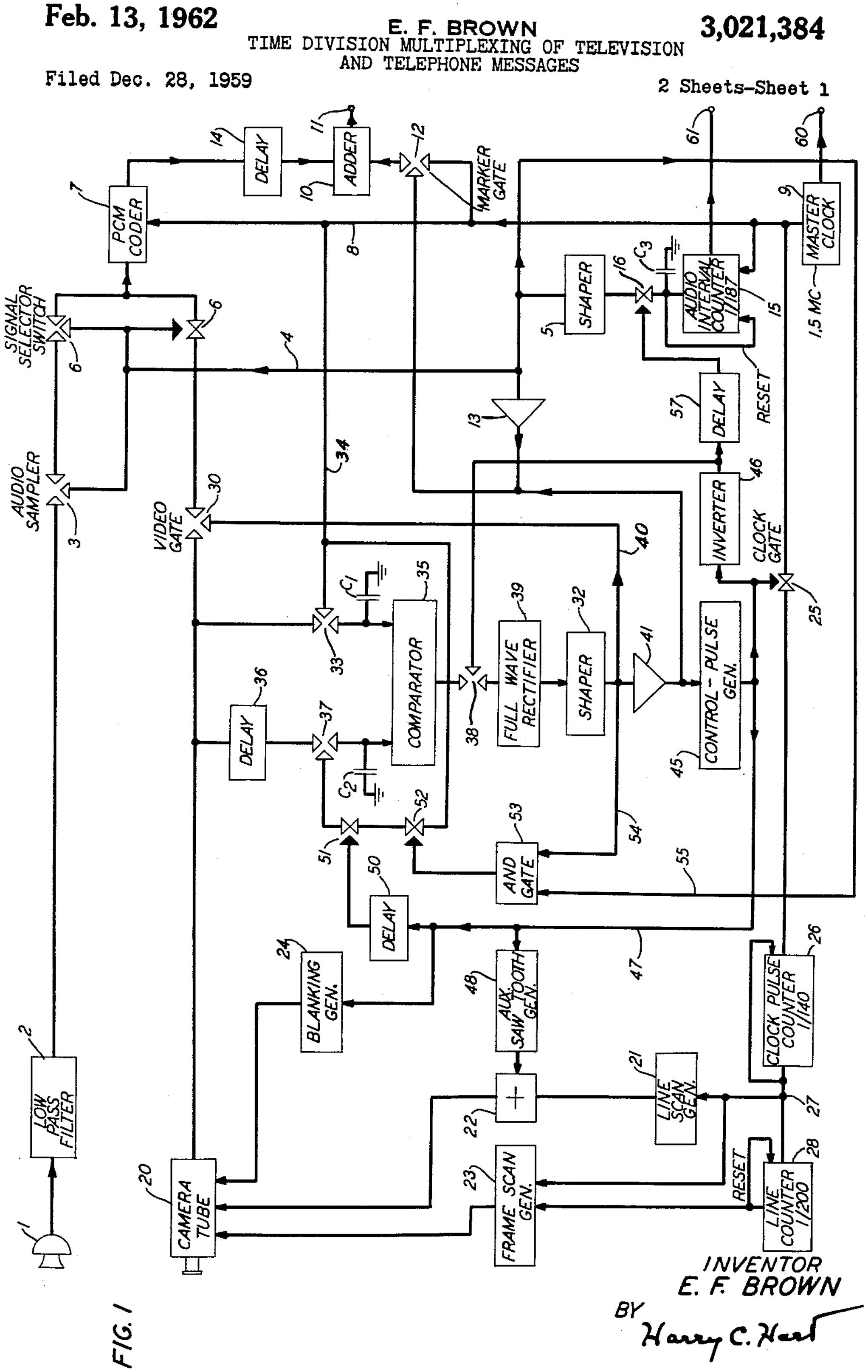

This invention deals with the multiplexing of a vision signal with a telephone message wave on a time-shared basis.

Commercial television requires, for the transmission of images of acceptable quality, a very wide band of frequencies. This is for the reason that the television system may be asked to pick up, transmit and reproduce scenes of wholly arbitrary character, even including rapidly moving objects. This prodigality of bandwidth is justified only because any geographical area is served by a small number of television channels.

In contrast, a band of a few thousand cycles per second in width suffices for the transmission of a voice message of good quality. Consequently, the addition of a voice message to a commercial television signal does not significantly increase the total bandwidth required and can be accomplished in many different ways, e.g., by transmitting voice message samples during the fly-back times of the vision signal scanners.

The situation is quite otherwise when it is desired to supplement an ordinary telephone conversation with a coordinated vision signal. Because the number of telephone channels serving any geographical area is already enormous, the frequency band required for the accompanying vision signal must be restricted; not necessarily to a telephone message band but at least to band that is very much narrower than that of a commercial television channel.

The scene to be transmitted by such a vision signal accompaniment consists, for the most part, of the face of the speaker against the walls of his office as a background. Movement of objects in the background is rare, and movements of the face of the speaker are generally slow. Accordingly, the scanning of such a scene on a point-for-point basis, and the generation of a brightness signal for each point scanned are wasteful. The situation calls, rather, for variable speed scanning, both at transmitter and receiver, for coordination of scanning speeds on a start-stop basis, and for the utilization of the natural sampling principle: i.e., the generation of a vision signal when and only when a transition takes place in the brightness of the scene that is in excess of a preassigned threshold. With the scenes of the sort here considered this technique makes for substantial economies in bandwidth.

It is a consequence of this approach to the generation and transmission of the vision signal, however, that the fly-back times of the scanners occur irregularly. Consequently it becomes impossible to transmit samples of the voice message during the fly-back times unless irregular transmission of the voice message wave samples is resorted to. Since regular sampling is preferable, for a voice message, to irregular sampling it becomes important somehow to combine the irregular samples of the vision signal, by interlacing them on a time-shared basis, with the regular samples of the voice message wave, and to effect the combination in such a way as to minimize the interference between the samples of the two kinds and hence the distortion which would otherwise result from such interference. To provide such for such interlacing is the principal object of the invention.

This object is attained in the following fashion. In the voice message wave path the voice message is recurrently sampled, normally with complete regularity and at the Nyquist rate. The amplitude of each sample is encoded in a permutation code group of pulses and these are transmitted to the receiver station where the sample amplitudes are recovered by a decoding process and reproduced as a speech sound. In the vision signal path a variable speed scanner is provided which advances from end to end of each of a succession of scanning lines, traveling at high speed over areas of substantially uniform brightness and pausing in its advance each time it encounters a brightness transition in excess of a preassigned threshold. During the pause the brightness immediately following the transition is evaluated, encoded into a code pulse group and transmitted to the receiver station. At the receiver station it is decoded and reproduced as an element of image brightness through the agency of a variable speed scanner whose movements are at all times constrained to be in spatial congruence with the corresponding movements of the scanner at the transmitter station. The two scanners thus travel together, taking as much time as may be necessary for the scanning of a line containing a large amount of detail and making up for the resulting delay in scanning other lines, e.g., lines in the background of the scene, in which the detail is small.

The audio code pulse groups are now interlaced, on the time scale, with the video code pulse groups, and the two are transmitted, on a time-sharing basis, over a common medium, to a receiver station. For the most part, there is no interference between audio code pulse groups and video code pulse groups. On the occasions when a video coding interval overlaps, on the time scale, an audio coding interval, the audio signal is given preference as far as possible, the generation of the video code pulse group being postponed until the processing, encoding and transmission of the audio sample has been completed and the audio code pulse group is on its way. Because the regularity of the audio sampling process has not been interfered with, reproduction of the audio sample takes place without distortion. Because of the unfailing spatial congruence of the movements of the receiver scanner with those of the transmitter scanner, the postponement of the video code pulse group in the time dimension makes for no degradation in the reproduced image.

Only in the single rare case in which the coding of a brightness transition in the scene has already commenced when the moment for the next regular audio sampling operation arrives is the audio processing operation deferred until the coding apparatus is again free. In accordance with a feature of the invention this postponement is carried out, not by taking the audio sample at the regular time and holding it until the encoder is ready to accept it, but rather by postponing the sampling operation itself. In consequence the sample, once taken, has the correct magnitude for the postponed sampling instant, and the audio code pulse group that represents it suffices for its correct reproduction at the receiver station at a similarly postponed reproduction instant. The following intersample interval is reduced in length by exactly the amount by which its predecessor was increased, so that the audio apparatus returns to its regular operation immediately. Correct reproduction can take place from a sequence of samples that are sufficient in number, even though they be to some extent "bunched." Hence, even in this extreme and rare case, the voice message can in principle be reproduced with no distortion. In practice the only distortion is that which arises from the departure of the characteristics of the reproducing filter from the ideal. This distortion may be reduced as far as may be desired by the employment of high quality reproducing filters, and it is always less than the distortion which would result from taking the audio sample at the regular instant, delaying its transmission, and reproducing it on arrival.

Figure 2:
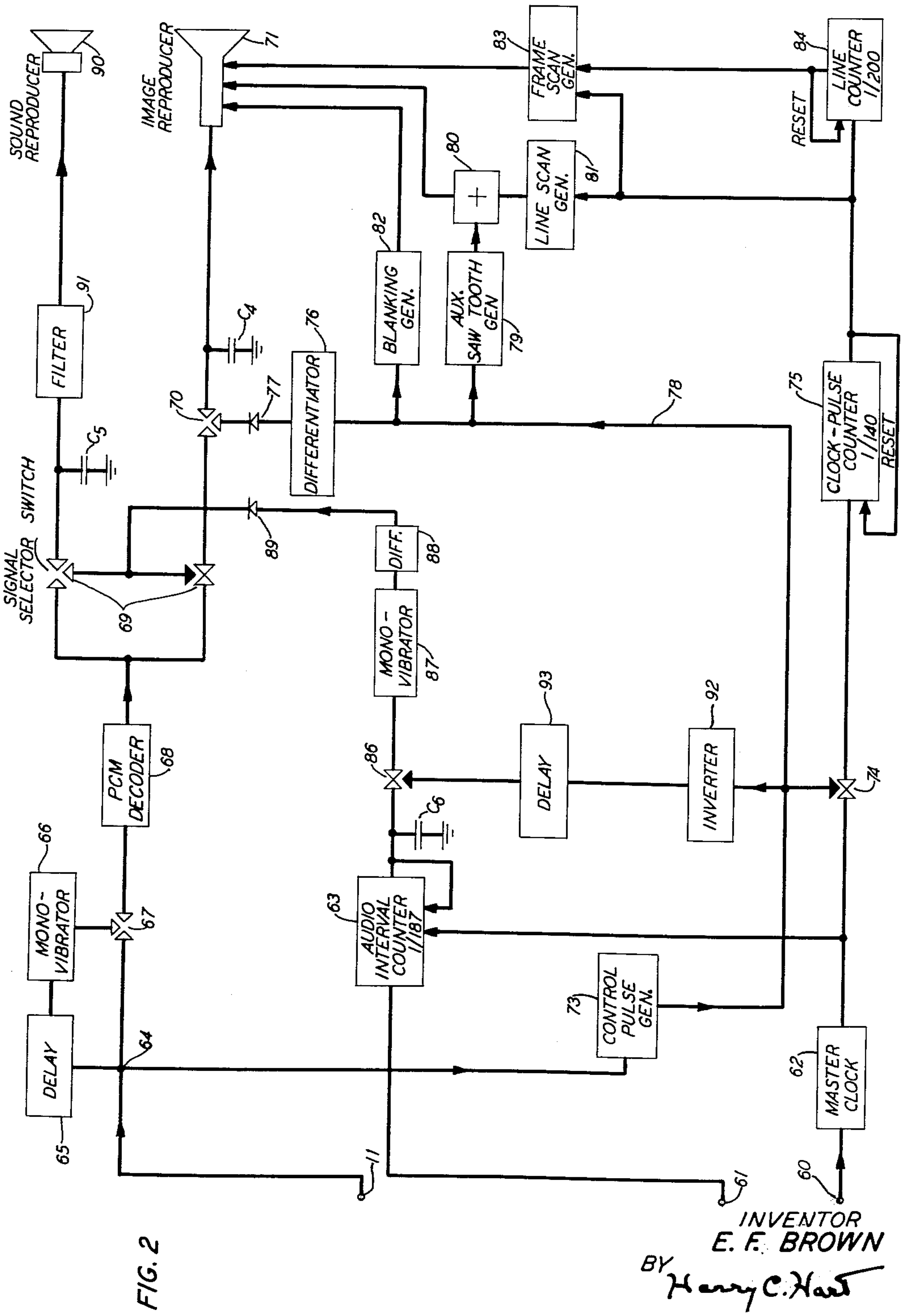

The invention will be fully apprehended from the following description of a preferred embodiment thereof taken in connection with the appended drawings in which:

FIG. 1 is a schematic block diagram showing transmitter apparatus embodying the invention; and FIG. 2 is a schematic block diagram showing receiver apparatus embodying the invention.

These figures are not actual circuit diagrams. Rather, each of them is a single line layout, each line indicating a transmission path or a control path. The system requires a number of switching or gating operations. The apparatus for performing these operations is shown, in most cases, by a group of three arrowheads arranged in one or another of two different ways. In each case the two arrowheads that point toward each other define a transmission path, to be established or disestablished by a control signal applied to a third arrowhead shown pointing toward the first two arrowheads. When the path is normally disestablished, to be established by a control signal, the first two arrowheads are shown spaced apart and the third control arrowhead is shown in outline. When, to the contrary, the transmission path is normally established, to be disestablished by a control signal, the first two arrowheads are shown in mutual contact and the third arrowhead is shown in solid black.

Referring now to the drawings, FIG. 1 is a block schematic diagram showing audio-video multiplex apparatus embodying the invention. Referring first to the audio path, a voice signal originating in a microphone 1 is first passed through a low-pass filter 2 of bandwidth B which serves to remove frequency components that cannot accurately be represented by the samples taken as described below. A sequence of normally regular brief samples of the filtered signal are taken by a sampler 3 that is recurrently operated at the Nyquist rate, i.e., it takes a number 2B of samples per second. The operation of the sampler is controlled by a sampling signal appearing on a conductor 4 and developed by a shaper 5 as described below. Occasional departures from complete regularity of the sampling operation, without reduction of the total number of samples taken per second, will be described below in connection with the multiplexing operation.

The resulting samples are consecutively applied to one input terminal of a signal selector switch 6 that is operated at the Nyquist rate under control of the sampling signal on the conductor 4. The selector switch 6 is provided with an additional input terminal to which video signals are applied in the fashion described below. Assuming, for the present, that at the moment under discussion there is no video signal the selector switch 6 passes each of the audio samples in succession and as it occurs to a coder 7 which converts its amplitude into a code pulse group counterpart, for example a binary permutation code pulse group arranged in the natural or conventional form. This coder, which may have any of a variety of wellknown forms, is provided with a control terminal to which timing pulses on a conductor 8 are applied, and these timing pulses are advantageously derived from a master clock 9 proportioned to deliver a sequence of like pulses that recur at a suitable rate, for example 1.5 megacycles per second.

For each audio sample applied to its input terminal the coder 7 thus delivers a train of pulses at its output terminal, for example seven in number and spaced apart by an interpulse period of 0.666 microsecond. Successive ones of such pulse trains, to the contrary, are normally spaced apart by a Nyquist interval for the voice wave which, for the 4,000 c.p.s. voice bandwidth that is presently accepted as standard in telephone technology, is 125 microseconds. Thus, since in units of a single pulse from the master clock 9 the Nyquist interval is 187 clock pulses in length ($125 \div 0.666 = 187$) there normally occurs between the last code pulse of one train and the first code pulse of the following train an interval of 180 clock pulses. In accordance with the invention this interval is turned to account for the acceptance of the majority of video code pulse groups generated in the fashion described below.

For reasons that will appear below it is advantageous that each audio code pulse group be preceded by a marker pulse. This marker pulse is conveniently derived from the master clock 9 and passed through an adder 10 and into the outgoing line 11 through a switch 12 that is briefly operated once for each Nyquist interval by the audio sampling pulse; i.e., the output of the shaper 5 through the buffer 13. In order that this marker pulse shall precede the audio code pulse group, in contrast to coinciding with its first pulse, the entire code pulse group is postponed by a single clock pulse interval before being combined with the marker pulse. A delay device 14 carries out the postponement.

For the simultaneous control of the audio sampler 3, the signal selector switch 6 and the marker gate 12 a control pulse, preferably with abrupt leading and trailing edges, is derived from the shaper 5, e.g., a single-trip multivibrator, operated by an audio interval counter 15 through a normally enabled switch path 16. This counter 15 may be of conventional construction and arranged to count an appropriate number of master clock pulses, in this case 187 of them, and to deliver its output pulses and reset itself upon the conclusion of its count.

Turning now to the video signal path, this signal may originate in a camera tube 20 having provision for causing a pickup beam to scan a two-dimensional electrostatic image of a scene to be transmitted, preferably line by line, under control of a line scan generator 21, whose output is applied through an adder 22 to the horizontal deflection elements of the tube 20 and a frame scan generator 23 whose output is applied to the vertical deflection elements of the tube 20. For reasons to be described below the tube 20 is also provided with a control electrode for obliterating or blanking its electron beam, and the output of a blanking generator 24, controlled as described below, is applied to this electrode.

As in the case of the audio channel, timing is controlled by the master clock 9. Its pulses pass through a normally enabled clock gate 25 to a clock pulse counter 26 wihch counts a number of clock pulses equal to the maximum number of discernibly different picture elements which can be encountered in the scanning of a single line, e.g. 140 of them and, upon conclusion of its count, resets itself and delivers an output pulse on a conductor 27. This output pulse serves to trip the line scan generator 21 which delivers a sawtooth wave of appropriate rise rate, peak amplitude and abrupt return with each control pulse applied to it. The output of the line scan generator may have pauses introduced into it in the manner described below. With or without such pauses it is applied to the horizontal deflection elements of the camera tube 20 to control the lateral movements of the scanning beam.

The output of the clock pulse counter 26 is also applied to a line counter 28 whose construction may be similar to that of the clock pulse counter 26 and of the audio interval counter 15 but is proportioned to count the pulses applied to it up to the number of different scanning lines from which the image of the transmitted scene is to be reproduced, for example 200. Upon the completion of its count it resets itself and delivers an output pulse to one input point of the frame scan generator 23 constructed to deliver an output wave having the form of a staircase of a precisely determined number of steps, all alike in height. The width of each "tread" of the staircase is determined by the interval between successive output pulses of the clock pulse counter 26, delivered to a second input point of the frame scan generator 23 and this, in turn, depends on the number of occasions during the scanning of a single line on which master clock pulses are blocked by the clock gate 25.

Passing, for the present, the controls of the video path, the output of the camera tube 20 is applied to a video signal gate 30 and, when the conduction path through this gate is established by a control signal applied to its control terminal, the output of the camera tube 20 passes through the video gate 30 to the second input terminal of the signal selector switch 6, the path through which is normally established. As will be described below, this signal selector switch 6 operates to pass either an audio sample arriving at its first input terminal or a video sample arriving at its second input terminal, but never both together. The output terminals being connected together the video sample, if passed by the gate 30 and the switch 6, is converted into a code pulse group by the coder 7, delayed by a single clock pulse interval by the delay device 14 and delivered through the adder 10 to the outgoing line 11. As in the case of the audio sample and for similar reasons, the code pulse group is preceded by a marker pulse derived from the master clock 9 and passed through the adder 10 to the outgoing line 11 through the marker gate 12 under control of the output of a second shaper 32 that forms part of the video control apparatus to be described below. Thus the marker gate 12 responds in the same way, by interposing a marker pulse ahead of the code pulse group, in the one case to the output of the audio control path shaper 5 and, in the other case, to the output of the video control path shaper 32.

The controls for the video portion of the apparatus are best described in connection with a particular example in which, for illustration, it is assumed that a substantial fraction, for example the first half, of a particular scanning line in the scene being scanned is substantially devoid of detail.

Under this condition of the video gate 30 remains opaque to the vision signal reaching it from the camera tube 20 due to lack of any enabling pulse applied to its control terminal. Hence, during whatever time it takes to scan this portion of the scene, no video signals are passed to the signal selector switch 6, or transmitted.

Suppose, now, that in its progress along the line the scanning beam of the camera tube 20 encounters an abrupt transition in the brightness or light value of the scene. The light value immediately following this transition passes through a sampling switch 33 that is operated by the consecutive master clock pulses over conductors 4, and so to one input point of a comparator 35. Each sample thus taken is held on a condenser $C_1$ until replaced by the following sample. The light value immediately preceding the transition is delayed by a single master clock pulse by a delay device 36 and thus brought into coincidence, on the time scale, with the former. This light value passes through a similar sampling switch 37, similarly operated, and so to a second input point of this comparator 35, each sample thus taken being similary held on a condenser $C_2$ until replaced by its successor.

The comparator 35 may take any of a wide variety of forms, several of which are illustrated and discussed by Millman and Taub in "Pulse and Digital Circuits" (McGraw-Hill, 1956), Chapter 15. It deliverers an output that is proportional to the difference between its two inputs. This difference-representing output is passed through a normally enabled switch 38, a full wave rectifier 39 and the shaper 32 and appears as a control signal for application by way of a conductor 40 to the control terminal of the video gate 30. The shaper 32, which may take any of a variety of forms, is proportioned to respond when the rectified, difference-representing output of the comparator 35 exceeds a preassigned threshold, and not otherwise. Thus the path through the gate 30 is established only for significant transitions in the light value of the scene.

The same output of the shaper 32 is also applied, by way of a buffer 41, to the control terminal of the marker gate 12, and as an input signal to a control pulse generator 45 which may be a single-trip multivibrator proportioned to rest, normally, in a first state, to respond to an input pulse by shifting to a second state, to hold the new state for at least eight clock pulse intervals, and thereupon to return to its first state. Its output may be in the form of a negative voltage signal. This is applied, through an inverter 46 which converts it to a positive signal, to the control terminal of the switch 38 thus occasionally to block transmission of the output of the comparator 35 from the rectifier 39, and to do so for the duration of the output pulse of control pulse generator 45, i.e., for eight clock pulses.

At the same time the output of the control pulse generator 45 is utilized to disable the video signal-producing functions. To this end it is applied to several points. First, by application over a conductor 47 to the control point of an auxiliary sawtooth generator 48 it introduces a pulse into the line scan. This pause may be relative or absolute as preferred; i.e., the scanning beam may be brought to a dead stop or its speed may be reduced to a suitable low magnitude such that it can recover all necessary detail of the brightness transition before moving on. The introduction of the pause is effected in the following manner. The auxiliary sawtooth wave generator 48 is proportioned to deliver a single pulse of sawtooth form, of eight clock pulses' duration, and of polarity opposite to that of the output wave of the line scan generator 21, and to do so each time it is actuated by the output of the control pulse generator 45. Its output is combined with that of the line scan generator 21 in the adder 22. The combination of the two waves comprises a pseudostaircase wave of flat, 8-clock-pulse treads, and sloping risers.

Next, the control pulse actuates the blanking generator 24 which extinguishes the electron beam of the camera tube 20, for the duration of the pause.

Third, and after the lapse of a single clock pulse interval introduced by a delay device 50, it is applied as a disabling pulse to the control point of a normally enabled switch 51. When not so disabled, the switch passes the master clock pulse sequence, received over the conductor 34, to the sampling switch 37, thus to assure that the charge appearing on the holding condenser $C_2$ shall always represent the latest brightness signal sample. When the path through switch 51 is disabled by the 8-clock-pulse output of the control pulse generator 45, the charge corresponding to the brightness succeeding a transition is held for a period of eight clock pulses.

In addition, the train of master clock pulses normally applied to the switch 37 passes through a normally enabled switch 52 and the train is occasionally broken, by application to the control terminal of this switch, of the pulse output of a coincidence gate 53 which occurs when, and only when, the output of the video shaper 32 reaching the gate 53 by way of a conductor 54, and that of the audio shaper 5 reaching the gate 53 by way of a conductor 55, coincide in time. This arrangement enables the coincidence, in time, of the start of an audio code interval with the arrival of the video scanner at a brightness transition, to exert an additional influence on the events that take place in the video control path. In particular this coincidence acts to retain the brightness value of the scene immediately preceding the transition on the capacitor $C_2$, instead of the brightness value succeeding the transition, normally stored on this capacitor. At the conclusion of the audio coding interval, video scanning is resumed, and the scanner now "sees" the brightness of a picture element that is removed by one picture element from the transition, and the comparator 35 compares the brightness value of this element with that of the element preceding the transition. This departure from the normal comparison of two elements that are always immediately contiguous results, in principle, in some degradation of the reconstituted image. However, it occurs but rarely and, when it does occur, it is very small.

As a result of the operations of all these apparatus components, coordinated in the fashion just described, a video sample is passed by the video gate 30 each time the path through it is established, and the establishment of this path takes place immediately following the passage of the scanning beam of the camera tube 20 across a transition in the brightness of the scene that exceeds a preassigned threshold level determined by the sensitivity of the shaper 32, and not otherwise.

The output of the control pulse generator 45, changed in polarity by the inverter 46 is also passed through a delay device 57 to the control terminal of the switch 16. As described above, the path through this switch is normally established so that the shaper 5 delivers a single output pulse once for each full count of the audio interval counter 15. When the path through the switch 16 is broken by the delayed output of the control pulse generator 45, the corresponding output pulse from the audio interval counter 15 is held on a condenser $C_3$ and so delayed for as long as the inhibiting condition exists; namely for the remainder, whatever it may be, of the current video coding interval. Assuming the most extreme case to exist, this delay is, at most, seven master clock pulses, i.e., from the normal interval of 187 clock pulses to the exceptional interval of 194 clock pulses. Since the operation of the audio interval counter 15 is not in any way affected, the following audio sampling interval is reduced by the same amount, namely to 181 master clock pulses. In consequence, the postponement of a particular audio sampling operation, necessitated by the fact that a video coding interval is in progress when the normal audio sampling time arrives, is exactly balanced by the shortening of the next audio sampling interval so that regularity of the audio sampling process is restored at the earliest possible moment.

It will be observed that the operation of the apparatus as described above is to accept an audio signal sample, in preference to a video signal sample, on those occasions in which the normal audio sampling instant coincides, to within a single master clock pulse, with the recognition of a video brightness transition. The apparatus component principally responsible for this audio preference is the delay device 57 through the agency of which the postponement of the audio sampling pulse by the control pulse output of the control pulse generator 45 takes place only after the shaper 5 has passed the audio sampling pulse to its destination. The controls described above act to hold the brightness value preceding the video transition until after the processing, encoding and transmission of the audio sample have been completed. As a result, the audio sample may be reconstructed without delay and hence without distortion. As will appear more fully below, the employment of the start-stop principle to attain spatial congruence between the receiver video scanning apparatus and the transmitter video scanning apparatus results in the fact that the preferential treatment of the audio sample through postponement of the video sample minimizes the consequent distortion in the reconstructed image.

Turning now to FIG. 2, the timing of the operation of the receiver apparatus here shown is under control of a master clock 62 and of an audio interval counter 63, which are maintained in synchronism with the clock 9 and the counter 15, respectively, at the transmitter. The maintenance of such synchronism is secured by a first timing path 60 that interconnects the two master clocks 9, 62 and a second timing path 61 that interconnects the two audio interval counters 15, 63.

The train of information-carrying pulses as developed by the apparatus of FIG. 1 arrives by way of the main transmission path 11 at an intersection point 64. Here, after the lapse of a single clock pulse interval interposed by a delay device 65 the first pulse of each group to arrive, namely the marker pulse, operates to trip a monovibrator 66 from one of two conditions to the other. By adjustment of its time constant it is proportioned to return to the first condition after the lapse of seven clock pulses. During this 7-clock pulse intervals it establishes a path from the intersection point 64 through a switch 67 to a decoder 68. Because of the relay interposed by the delay device 65 the marker pulse is prevented from reaching the decoder 68. Hence the pulses that in fact reach the decoder 68 are all representative of the amplitude of a single sample of the vision signal or of the audio signal as the case may be.

Normally, the video amplitude samples considerably outnumber the audio samples. Normally, too, the audio samples recur at regular intervals as determined by the audio interval counter 15. Hence a decoded sample that arrives at a random instant during a single audio interval counter cycle is presumptively a video sample. On this presumption the output of the decoder 68 is routed by way of a normally enabled path through selector switch 69 and through another switch 70 that is occasionally enabled in a manner to be described below, to a suitable electrode of an image reproducer 71, e.g., to the control electrode of a cathode ray oscilloscope. Furthermore each sample, after such application, is held without change on a holding condenser $C_4$ until the arrival of the next video sample.

At the same time, the marker pulse arriving at the junction point 64 is applied to trip a control pulse generator 73, which again may be a monovibrator, from its rest condition to a different condition. This unit is proportioned to deliver on its output conductor a negative voltage signal which endures for eight clock pulse intervals, and thereupon to return to its rest condition. By application to the control terminal of a normally enabled clock gate 74, this voltage acts to disable the path from the master clock 62 to a clock pulse counter 75, and thus introduces a pause in the operation of this counter which endures for eight clock pulse intervals.

A differentiator 76 converts the output of the control pulse generator 73 into a pair of sharp, brief pulses, a negative one coinciding with the leading edge and a positive one coinciding with the trailing edge. A rectifier 77 blocks the initial negative pulse and passes the terminal positive pulse to the control terminal of the switch 70 thus establishing the path through this switch for a brief interval at the instant when the decoding operation carried out by the decoder 68 has been completed. This switch 70 then acts to pass the decoded vidio amplitude sample to the holding condenser $C_4$ and to the image reproductive device 71.

During the decoding operation it is desirable that the advance of the scanning beam of the reproducer tube 71 be halted and that, during such pause, the beam be blanked out. The duration of the pause is determined by the output of the control pulse generator 73. This is applied by way of a conductor 78 to an auxiliary sawtooth generator 79 whose output is additively combined in an adder 80 with the output of a line scan generator 81. As in the case of the transmitter apparatus the clock pulse counter 75 counts a preassigned number, for example 140 of the clock pulses actually reaching it, pausing in its count during such times as the clock pulse path is broken by the clock switch 74. At the conclusion of each such count it resets itself and delivers a pulse to actuate the line scan generator 81 that is proportioned to deliver an output that increases continuously in the fashion of a sawtooth wave and, the output having reached a preassigned magnitude, to return abruptly to its initial condition. In the absence of a pause, the output of the line scan generator controls the horizontal deflection of the cathode beam of the tube 71 to advance steadily from one end of a scan line to the other. As above stated, however, it is required to introduce a pause into this advance each time a video sample is to be reconstructed, and this pause is effected by combining with the output of the line scan generator 81 the output of the auxiliary sawtooth generator 79 proportioned to deliver, each time it is actuated by the control pulse generator 73, a single voltage sawtooth having a slope equal and opposite to that of the sawtooth voltage of the line scan generator 81 and of eight clock pulses' duration. The combination of the two waves in the adder results in halting the advance of the cathode beam.

Application of the output of the control pulse generator 73 to the blanking generator 82 acts to disable the cathode beam for the duration of the pause.

Scanning in the vertical dimension is controlled by a frame scan generator 83 under the joint control of the output of the clock pulse counter 75 and the output of a line counter 84 which in turn is controlled by the output of the clock pulse counter 75. The line counter 84 is proportioned to count the same number, for example 200, of such output pulses as does the similarly designated unit 28 in the transmitter apparatus, and thereupon to reset itself. As in the case of the transmitter apparatus the output wave of the frame scan generator 83 preferably has the form of a staircase, thus to advance the cathode beam in stepwise fashion from each scanning line to the next and, after the scanning of all the lines has been completed, to return to its starting point.

As indicated above, marker pulses that arrive at the junction point 64 at random instants during the cycle of the audio interval counter precede video code pulse groups, while any marker pulse that arrives at the junction point at precisely the instant at which the audio interval counter 63 is delivering its output pulse presumptively precedes an audio code pulse group. At this instant two events take place simultaneously: (*a*) the marker pulse trips the control pulse generator 73 to disable the picture producing functions as described above; and (*b*) the audio interval counter 63 delivers a single one of its cyclic output pulses and resets itself. This output pulse passes through a normally enabled switch 86 and trips a monovibrator 87 from its rest condition to a different condition. It is proportioned to retain its new condition for a period of seven clock pulses and thereupon to return to its rest condition. Its rectangular output pulse is converted by a differentiator 88 into a brief pulse of one polarity coinciding with its leading edge and another brief pulse of the opposite polarity coinciding with its trailing edge. A rectifier 89 blocks the initial pulse and passes the final pulse to control terminals of both branches of the selector switch 69, thus to disable the path from the decoder 68 to the image reproducer 71 and to enable, instead, a path from the decoder 68 to a sound reproducer 90. By virtue of the seven clock pulse delay introduced by the monovibrator 87 this enablement takes place at the instant when the operation of decoding the audio code pulse group has been completed. The audio path being enabled only for a brief instant, the magnitude of the audio sample is held on a condenser $C_5$ until the arrival of the following sample, whereupon the condenser holds the new sample instead. The sequence of such held, and thereby stretched, samples is preferably smoothed by a filter 91 before application to the reproducer 90.

Suppose that, at the transmitter, one of the regular audio sampling instants occurred during the processing of a video sample, already underway. It was explained above that in this case the normally regular audio sampling instant was postponed until the video sample processing was completed, whereupon the audio sample, instead of being discarded, was taken slightly later on the time scale than its normally regular instant. Under this condition, suppose that the code pulse group immediately preceding a delayed audio sample, and thus representing a video sample, is in process of being decoded by the decoder. Its preceding marker pulse will have operated the control pulse generator 73 as described above. The output of the control pulse generator 73 passes, in addition to the paths described above for disabling the picture producing operations, into a supplementary control path comprising an inverter 92 and an element 93 which introduces a delay of a single clock pulse interval and to the control terminal of the switch 86. This acts to withhold the output of the audio interval counter 63 from the monovibrator 87 and to hold it, instead, on a condenser $C_6$ until the expiration of the delayed 8-clock-pulse output of the control pulse generator 73; i.e., until nine clock pulse intervals shall have elapsed since the arrival of the video marker pulse at the junction point 64, whereupon the path through the switch 86 is re-established. At this point of time the audio interval counter output pulse, thus held and no longer blocked, actuates the monovibrator 87 to deliver its output of seven clock pulses' duration as described above. Also as described above, the differentiator 88 and the rectifier 89 act at this instant to disestablish the video path and to establish the audio path. By coordination of sampling instants and sample postponements in the fashion described above, this event takes place at exactly the instant at which the decoder 68 has completed its operation of converting the audio sample code pulse group into an audio sample for reproduction by the sound reproducer 90.

It will be noted that, by virtue of the start-stop principle embodied in the video parts of the system, postponement of a video sample for the sake of an audio sample already in process makes for no distortion of the reproduced image. In the rare case in which an audio sample must be postponed for the sake of a video sample already in process there is, in principle, no distortion in the reproduction of the sound, since the total number of audio samples utilized for the reproduction has not been reduced. Rather, a single audio sample among a large number of regular ones has been displaced on the time scale from its normal position. With adequate provision for this contingency beforehand in the construction of the filter 91 such sample postponement makes for no distortion. Hence the technique here employed is greatly superior to the postponement of the transmission of a sample taken at its regular, assigned instant. For a full discussion of the theoretical background of this matter reference may be made, for example, to "Modulation Theory" by H. S. Black (Van Nostrand, 1953) page 50.

Only in the still rarer case in which one of the regular audio sampling instants coincides exactly with a video sampling instant does any distortion of any kind result. Inasmuch as the system gives preference, in this case, to the audio sample there is no distortion of the reproduced sound. The only degradation of the reproduced image is the very small amount that results, in this case, from the action of the transmitter apparatus in determining the magnitude of a transition by comparison of the light value of the picture element momentarily being scanned, not with the light value of its immediate predecessor, but with that of its predecessor next but one. As a practical matter, such occasional small degradation in the exactitude with which a video brightness transition is reconstructed is of negligible importance.

What is claimed is:

1. In combination with a video signal generator having a variable speed scanner and an audio signal generator, apparatus for transmitting the signal outputs of said generators on a time-shared basis over a common medium which comprises means defining a regular sequence of discrete time slots, equal in number to the distinguishable picture elements of a scene to be transmitted, means for deriving a periodic control wave of which the frequency is an integral submultiple of the time slot frequency, means for deriving a normally regular sequence of samples of said audio signal under control of said control wave, means for encoding each of said samples, the encoding of each such sample occupying an audio code interval, means under control of said time-slot defining means for causing said scanner to sweep along successive lines of said scene in discrete jumps, one for each time slot, sweeping uniform-brightness elements of each line at high speed and pausing at the time slot immediately following each brightness transition in excess of a preassigned threshold, means for generating, at each said pause, a video code signal representative of the brightness of the scene at each said transition, said generation occupying a video code interval, whereby successive line scans occupy times that are dependent on the number of brightness transitions encountered and hence are normally unequal, means operative throughout the duration of each code interval of either kind for inhibiting the subsequent generation of a code signal of the other kind, means operative on the coincidence, within a single slot, of the inception of a video code interval with the inception of an audio code interval for inhibiting the generation of the video code signal, means for transmitting each generated code signal to a receiver station and, at said receiver station, a variable-speed image reproducer, means constraining each movement of said reproducer to be spatially congruent with a corresponding movement of said scanner, means including said reproducer for synthesizing an image of said scene from said video code signals, and means for reproducing a sound from said audio code signals.

2. In combination with apparatus as defined in claim 1, means for generating an auxiliary pulse marking the derivation of each audio sample, means for transmitting said auxiliary pulses as a train to said receiver station and, at said receiver station, means for normally routing incoming signal samples to said image reproducer, and means under control of each pulse of said auxiliary train for routing a simultaneously incoming signal sample to said sound reproducing means.

3. Audio-video time division multiplex apparatus which comprises means at a transmitting station for deriving from a speech wave a regular sequence of audio samples, the duration of each sample being brief compared with the intersample interval, means for transmitting said audio samples in regular succession to a receiver station, means at said receiver station for reproducing a speech wave from regularly incoming audio samples, scanning means at said transmitter station for deriving from a scene to be transmitted an irregular sequence of video samples, each representative of a light value transition in said scene, means operative throughout the major portion of each audio intersample interval for normally transmitting to said receiver station each video sample as it is taken, means operative throughout a minor portion of each audio interpulse interval, commencing with an audio sampling instant and enduring throughout an audio-processing period, for temporarily postponing the transmission of a video sample that may be taken during said period until after the expiration of said period, and, at said receiver station, scanning means for reconstructing an image from incoming video samples, and start-stop control means for holding said last-named scanning means in spatial congruence with said first-named scanning means, whereby reconstruction of said image is unaffected by said video sample postponement.

4. Audio-video time division multiplex apparatus which comprises means for generating a regular sequence of clock pulses, one for each distinguishable picture element of a scene to be transmitted, said pulses recurring at a rate $r$, count-down means for deriving from said clock pulse sequence a control pulse train of which the frequency is the $n$th integral submultiple of said pulse frequency, the pulses of said train thus recurring at a rate $$\frac{r}{n}$$

whereby the $n$th one of each group of $n$ pulses of said sequence coincides in time with a pulse of said train and the remaining $n-1$ pulses of said group do not so coincide, means operative in response to each of said coincidences for deriving a sample of an audio wave to be transmitted, means for transmitting said audio samples in regular sequence to a receiver station, scanning means for deriving a video sample of the light value of a scene to be transmitted each time said scanning means encounters a light value transition in excess of a preassigned threshold, the sequence of such video samples being thus irregular on the time scale, means normally operative when such a video sample coincides with one of said $n-1$ clock pulses for transmitting said video asmple to said receiver station, means, operative on the occurence of said $n$th clock pulse and for the duration of an audio processing period thereafter, for temporarily postponing the transmission of any video sample that may be derived during said audio processing period, and, at said receiver station, means for reproducing a sound from regularly transmitted audio samples and start-stop means for reconstructing an image of said scene from said irregular sequence of video samples, whereby the quality of said reconstruction is unaffected by said temporary postponements.

5. In a system for transmitting, on a time-shared basis and over a common medium, a normally regular sequence of speech samples and an irregular sequence of video samples, means at a transmitter station and operative on the concurrence of a video sampling instant with a speech sampling instant for preferentially selecting the speech sample for transmission and for postponing the transmission of the video sample and means, operative only throughout a video sample processing interval commencing with a video sampling instant, for postponing the taking of a single sample of said normally regular speech sample sequence until the expiration of said interval and, at a receiver station, means for reconstructing the consecutive received video samples at points that are spatially congruent with points of a scene from which they were derived, and means for reproducing the consecutive received speech samples at instants of time that are temporarily congruent with the instants at which they were derived.

6. In a system for transmitting, on a time-shared basis and over a common medium, a normally regular sequence of speech samples and an irregular sequence of video brightness transition samples, means at a transmitter station for normally comparing brightness values of picture elements that are contiguous on a scanning line to derive said transition samples, means operative on the concurrence of a video sampling instant with a speech sampling instant for preferentially selecting the speech sample for transmission and for postponing said comparison, and means, operative at the conclusion of each speech sample processing interval, for comparing brightness values of picture elements that are not contiguous on a scanning line to derive a delayed brightness transition sample.

References Cited in the file of this patent

UNITED STATES PATENTS

| | | |
|---|---|---|
| 2,321,611 | Moynihan | June 15, 1943 |
| 2,939,909 | Toulon et al. | June 7, 1960 |

FOREIGN PATENTS

| | | |
|---|---|---|
| 813,510 | Great Britain | May 21, 1959 |